June 7, 1927.

W. E. LANE 1,631,494

SCALE PLATE FOR TYPEWRITING MACHINES

Original Filed June 10, 1925

Inventor:
William Edward Lane

Patented June 7, 1927.

1,631,494

UNITED STATES PATENT OFFICE.

WILLIAM EDWARD LANE, OF ST. LOUIS, MISSOURI, ASSIGNOR TO UNDERWOOD TYPEWRITER COMPANY, OF NEW YORK, N. Y., A CORPORATION OF DELAWARE.

SCALE PLATE FOR TYPEWRITING MACHINES.

Application filed June 10, 1925, Serial No. 36,272. Renewed April 30, 1927.

The invention relates generally to scales for typewriting machines and particularly to that form of such devices which employs a mountable and demountable scale for tabulating purposes.

Its purpose is to provide means to dispense with the necessity of incising or otherwise forming on such auxiliary scales the characters of a tabular form, and to enable the user to construct any desired form of scale by using the improved device as a carrier for a tabular form printed or typed on paper.

There are numerous instances where it would be inadvisable to provide scales of the incised or other type of factory-made scale for all the tabular forms it was desired to use, and in such instances the construction shown and described herein affords an inexpensive and efficient substitute for the factory-made type of tabulating scale.

A further advantage consists in the means provided to protect the paper forming the inner scale face, or guide, from abrasive contact with the main scale (particularly in cases where the main scale is of the incised type), thus making possible a double use of the carrier, which otherwise would be impracticable or impossible.

In the accompanying drawings

Figure 1:
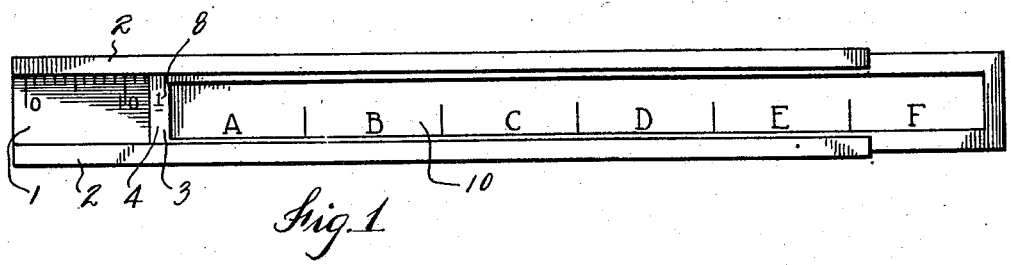
Figure 1 is an elevation showing the device partially assembled in a typewriter scale having retaining means to receive it.
Figure 2:
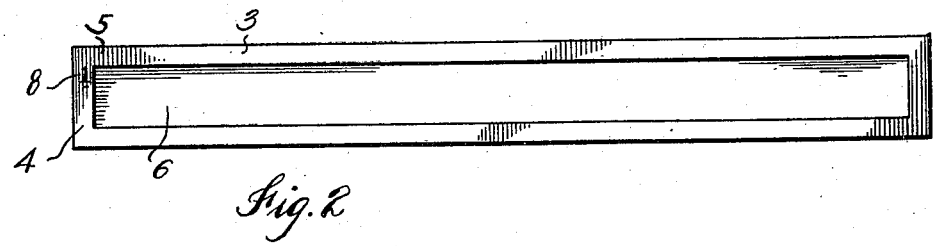
Figure 2 is an elevation of the obverse face of the device.
Figure 3:
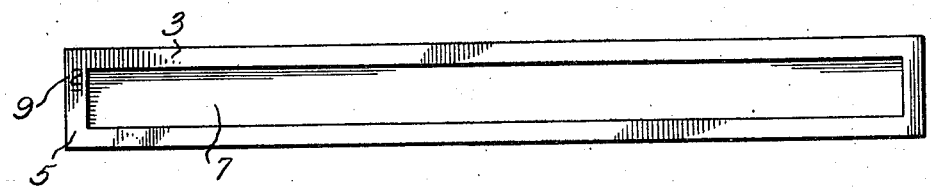
Figure 3 is a similar view showing its reverse face.
Figure 4:
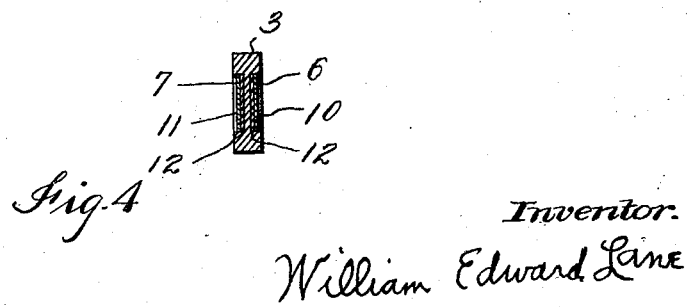
Figure 4 is a view in section taken on the plane lines 4—4 of Figure 1, showing assembly detail.

Referring to the drawings: The invention is devised to be used with a main typewriter scale of the type shown in the drawings, the body of which main scale is indicated by the numeral 1 and the flanges of which are indicated by the numeral 2, these flanges serving to receive the present invention which consists of a flat metal plate 3, the obverse face of which is indicated by the numeral 4 and its reverse face by the numeral 5. The flat plate 3 has formed upon its obverse face a shallow, rectilinear recess 6 and upon its reverse face a similar recess 7, both faces being exactly alike in all respects except for a differentiation in markings to distinguish one from the other in use, as indicated by the drawing numerals 8—9. The recesses 6—7 extend to upper, lower and side walls, as shown, and are of a depth slightly less than the paper tabular form inlays 10—11 indicated in the drawings as being applied to each face of the device and secured thereto by an adhesive 12. The upper and lower walls of the recesses 6—7 are spaced downwardly and upwardly with relation to the upper and lower edges of the retaining flanges 2 of the main scale 1 in which the device is assembled, thus providing a definite limit to the extent of the paper inlays.

In preparing the device for use as a tabulating aid, the tabular form is cut to the width and length of the recess, and then is secured to the plate 3 by an adhesive.

I claim:

1. In a scale plate for typewriting machines, a flat metal plate adaptable for mounting and demounting in and from retaining means formed in a main typewriter scale, a shallow, rectilinear, four-walled recess formed in one face of said plate, the said recess being adapted to receive a characterized paper inlay adhesively secured to its floor.

2. In a scale plate for typewriting machines, a structure as described in claim 1, the said plate being reversible and having upon its reverse face a recess exactly similar to that described in claim 1.

In testimony whereof I affix my signature.

WILLIAM EDWARD LANE.